United States Patent
Senthinathan et al.

(10) Patent No.: US 8,441,310 B2
(45) Date of Patent: May 14, 2013

(54) POWER CONTROL BASED ON DUAL LOOP WITH MULTIPLE PROCESS DETECTION CIRCUITS

(75) Inventors: Ramesh Senthinathan, Cupertino, CA (US); Hooman Moshar, Laguna Hills, CA (US)

(73) Assignee: Broadcom Corporation, Irvine, CA (US)

( * ) Notice: Subject to any disclaimer, the term of this patent is extended or adjusted under 35 U.S.C. 154(b) by 171 days.

(21) Appl. No.: 13/010,595

(22) Filed: Jan. 20, 2011

(65) Prior Publication Data

US 2012/0139624 A1  Jun. 7, 2012

Related U.S. Application Data

(60) Provisional application No. 61/420,377, filed on Dec. 7, 2010.

(51) Int. Cl.
 G06F 1/26 (2006.01)
 G05F 1/46 (2006.01)
(52) U.S. Cl.
 USPC ............................ 327/540; 327/530; 307/130
(58) Field of Classification Search .................... None
 See application file for complete search history.

(56) References Cited

U.S. PATENT DOCUMENTS

| 5,648,766 | A | * | 7/1997 | Stengel et al. ............ 340/870.39 |
| 7,319,358 | B2 | | 1/2008 | Senthinathan et al. |
| 7,423,475 | B2 | * | 9/2008 | Saha et al. ..................... 327/543 |
| 7,898,285 | B2 | * | 3/2011 | Bernstein et al. ............... 326/16 |
| 7,921,312 | B1 | * | 4/2011 | Pennanen et al. ............ 713/300 |
| 8,120,410 | B2 | * | 2/2012 | Meijer et al. .................. 327/534 |
| 2007/0152739 | A1 | | 7/2007 | Banerjee et al. |

* cited by examiner

*Primary Examiner* — Lincoln Donovan
*Assistant Examiner* — Terry L Englund
(74) *Attorney, Agent, or Firm* — Brake Hughes Bellermann LLP (57) ABSTRACT

According to an example embodiment, an apparatus for controlling a power supply voltage for an integrated circuit may be provided, which may include a plurality of different types of process region detection circuits, each process region detection circuit configured to identify a respective process region of a plurality of process regions. The apparatus may also include a voltage selection circuit configured to determine a highest voltage among the voltages associated with the identified process regions and to select a power supply voltage for the integrated circuit that is equal to the highest voltage, one or more functional test circuits configured to perform a functional test using the selected power supply voltage, and a voltage adjuster circuit configured to increase the selected power supply voltage if the functional test fails.

20 Claims, 5 Drawing Sheets

POWER CONTROL BASED ON DUAL LOOP WITH MULTIPLE PROCESS DETECTION CIRCUITS

CROSS-REFERENCE TO RELATED APPLICATIONS

This application claims priority to U.S. Provisional application Ser. No. 61/420,377, filed on 10 Dec. 2010, entitled "Power Control Based on Dual Loop With Multiple Process Detection Circuits," hereby incorporated by reference.

BACKGROUND

Integrated circuits (ICs) often vary in power consumption and performance with a change in a process and/or temperature. A process region or a process corner may refer to variations in fabrication process that may cause transistor (or device) operation or device speed to vary. For example, in a slow device (or slow corner or worst case corner), the speed of the device is relatively slow (e.g., the amount of time required for the device to charge, discharge or change states may be longer) due to a lower drain current for a given gate voltage. Similarly, in a fast device (or a fast corner or best case corner), the speed of the device is relatively fast due to a higher drain current for the same gate voltage. For example, a fast device may have a lower threshold voltage, which may allow the device (or transistor) to turn on (or switch states) at a lower gate voltage and/or may produce a higher drain current at the same gate voltage. For example, a device having a higher drain current for a specific gate voltage may charge and discharge (and therefore, switch states) faster than a device that has a lower drain current for the same gate voltage.

In many cases, ICs are usually designed for the worst case (or slow) process corner. A power supply voltage or VDD is typically selected and supplied to the IC based on the worst case or slow process corner. The supply voltage that is selected for a worst case or slow process corner is higher than the supply voltage that is necessary for a best case or fast process corner device to operate properly, and may result in excessive power consumption by the fast process corner device.

SUMMARY

Various example embodiments are disclosed relating to power control based on multiple process detection circuits.

DETAILED DESCRIPTION

Figure 1:
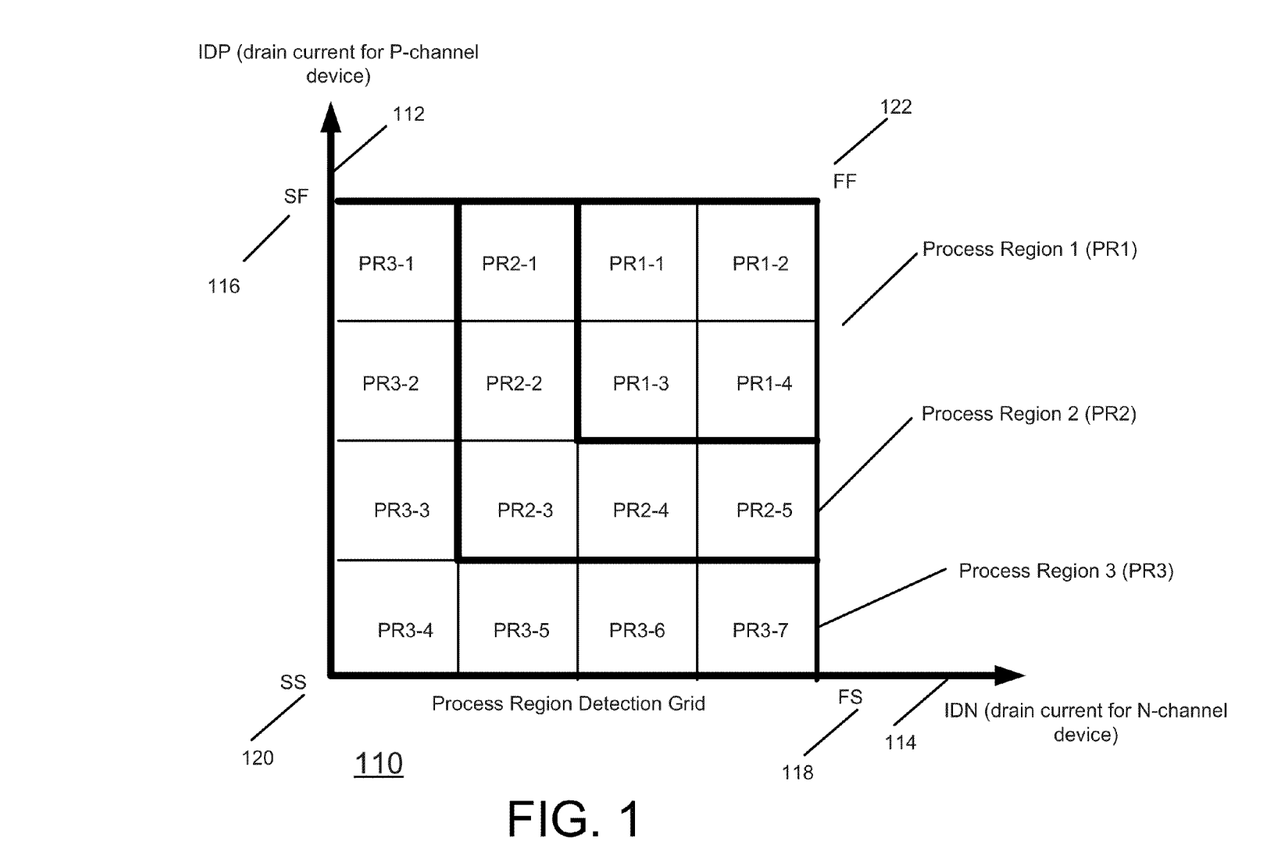
FIG. 1 is diagram illustrating a process region detection grid 110 for a process window according to an example implementation.

FIG. 1 is diagram illustrating a process region detection grid 110 for a process window according to an example implementation. In this example, the process region detection grid 110 may include a process window that identifies a range of acceptable processes or device performance, for example. The process window may be divided into a grid of sections, such as sixteen sections in this example, such as sections PR1-1 through PR1-4, sections PR2-1 through PR 2-5 and sections PR 3-1 through PR3-7. Although the process region detection grid is divided into 16 sections, any number of sections may be used.

The process region detection grid 110 identifies a drain current for P-channel devices (IDP) on a Y or vertical axis 112 vs. drain current for N-channel devices (IDN) on an X or horizontal axis 114. Drain current for an IC may be measured, for example, by applying a voltage to the gate of a P-channel and/or N-channel transistor and measuring the resulting drain current. In one example implementation, an upper left corner of the detection grid 110 may be referred to as a slow-fast (SF) corner 116 since this corner corresponds to processes having a (relatively) low drain current (IDN) for N-channel devices associated with slow N-channel devices and a (relatively) high drain current (IDP) for P-channel devices associated with fast P-channel devices. Thus, the slow-fast (SF) corner SF 116 refers to devices having slow N-channel devices and fast P-channel devices.

Similarly, the lower-right corner of the detection grid 110 may be referred to as a fast-slow (FS) corner 118 that refers to processes having fast N-channel devices (associated with higher N-channel drain current or higher IDN) and slow P-channel devices (associated with lower P-channel drain current or IDP). The lower-left corner of the detection grid 110 may be referred to as a slow-slow (SS) corner 120 that includes devices having slow IN-channel devices and slow P-channel devices. The upper-right corner may be referred to as a fast-fast (FF) corner 122 that includes ICs or processes having fast P-channel devices and fast N-channel devices.

in an example implementation, the process region detection grid 110 may be divided into a plurality of regions, where a different supply voltage may be used for each process region. For example, a lower supply voltage may be provided to fast devices (or devices having a higher drain current), and a higher supply voltage may be provided to slow (or slower) devices (or devices having a lower drain current). This may allow a first voltage (e.g., nominal or standard voltage) to be supplied to slow devices, and a second (or lower) voltage to be supplied to faster devices. This may allow power consumption to be decreased for fast (or faster) devices by using a lower supply voltage (e.g., less than a nominal or standard supply voltage) while still meeting the minimum performance requirements for the IC design.

In one example implementation, a process region may be identified for an IC. Each process region may be associated with a different supply voltage. The process regions may be process corners, or may be any region (or location) within the process region detection grid 110 (not limited to corners within the detection grid 110), e.g., based on drain current (e.g., IDP or IDN) or other measurement for one or more transistors or devices of the IC.

FIG. 1 illustrates one example implementation in which the process region detection grid 110 is divided into three process regions, including process region 1 (PR1), process region 2 (PR2) and process region 3 (PR3). In this example, PR1 may include sections PR1-1, PR1-2, PR1-3 and PR1-4. PR1 which may include fast P-channel devices and fast N-channel devices. Thus, PR1 may be referred to as a fast region. In this example, the fastest section within the process region detection grid 110 is PR1-2.

PR3 may include sections PR3-1, PR3-2, PR3-3, PR3-4, PR3-5, PR3-6 and PR3-7 (e.g., where the first number identifies the process region and the second number may identify a section number within the PR). In this example implementation, PR3 may include ICs or processes wherein one or both N-channel and P-channel devices are slow, e.g., including slow-slow devices. In this example, the slowest section within the process region detection grid 110 is PR3-4 (process region 3, section 4).

PR2 may be a typical or average process region that includes devices that are not fast-fast or slow-slow, and may include ICs or processes where at least one of P-channel or N-channel devices is medium speed (e.g., in-between fast speed and slow speed). For example, sections PR2-2 and PR2-3 may identify ICs or processes where both N-channel and P-channel devices are considered to be medium, average or typical speed. Therefore, in this example, PR2 may be referred to as a typical or average region (e.g., meaning that the devices for this region are identified as typical or average speed). However, the typical or average speed is still faster than the slow process region. Therefore, a lower supply voltage may be used, e.g., to decrease power consumption, for the typical or average region PR2, as compared to the slow region PR3.

According to an example implementation, a process region may be identified for an IC. In this example, the process region for an IC may be identified as either PR1 (e.g., fast region), PR2 (average or typical region) or PR3 (e.g., slow region). One or more process region (or process corner) detection circuits may be used to detect (or identify) a process region (or process corner) for an IC or process. For example, if an IC is identified as being any of sections PR1-1, PR1-2, PR1-3 or PR1-4 within process region detection grid 110, the IC may be identified as PR1 or a fast region (or fast corner). If an IC or process is identified as any of sections PR2-1, PR2-2, PR2-3, PR2-4 or PR2-5, the IC may be identified as PR2 or a typical/average process region. Similarly, if an IC is identified as any of sections PR3-1, PR3-2, PR3-3, PR3-4, PR3-5, PR3-6 or PR3-7, the IC may be identified as PR3 or a slow process region.

According to an example implementation, different supply voltages may be used for (or associated with) each process region. For example, a nominal or standard (or default) voltage (e.g., 1 V) may be used for PR3 since PR3 is a slow region. A supply voltage (e.g., 900 mV) that is less than the nominal or standard voltage may be used for PR2 (average or typical region). Similarly, in this example, a supply voltage (e.g., 800 mV) that is even less than that used for PR2 is used for PR1 (fast region).

Power may be conserved by using a lower supply voltage in the cases where an IC is typical or average speed (PR2) or fast speed (PR1). For example, tower supply voltages may be used on faster devices since faster devices may typically still provide the required drain current (and therefore, switching speed) even at a lower supply voltage. This allows speed to be traded off in favour of conserving power, at least for some types of process regions (or process corners).

According to one example model, active power my be proportional to $C*V^2*f$, where C is a capacitance of the device, V is the supply voltage, and f is the frequency. Also, a higher supply voltage may cause a higher leakage current, which wastes more power. Thus, decreasing the supply voltage (V) may significantly reduce the power consumption of the circuit or device, e.g., while still maintaining circuit performance within a margin or allowed tolerance. However, if the supply power is reduced too low, then the circuit may not operate properly or may not meet required operating requirements.

The process region detection grid 110 illustrated in FIG. 1 is merely one example way in which different process regions (or process corners) may be allocated, e.g., within a process window. Many other changes or variations may be used. For example, the grid 110 is divided into 16 sections, but any number of sections may be used. Also, it may not be necessary to sub-divide the process regions into sections at all. Similarly, while 3 process regions (PR1, PR2 and PR3) are used in this example, any number of process regions may be used. Also, while some example supply voltages are shown for the three process regions (1V for PR3, 900 mV for PR2, and 800 mV for PR1), other supply voltage may be used, and other step sizes between voltages of successive process regions may be used. 100 mV is used as a supply voltage step size between voltages of successive process regions, e.g., 800 mV, 900 mV and 1V. In another illustrative example, five process regions may be used (instead of three), and corresponding supply voltages may be used (from faster to slower) as 800 mV, 850 mV, 900 mV, 950 mV and 1V (1 V as the nominal or standard supply voltage). Also, non-uniform step sizes may be used for the different process regions.

According to an example implementation, a plurality of different types of process region detection circuits may be used to identify a process region for an IC. In one illustrative example, two or more of the following process region detection circuits may be used to detect or identify a process region for an IC, wafer, lot, process or circuit: 1) a standard ring oscillator; 2) a differential ring oscillator; 3) a PMOS (or P-channel Metal Oxide Semiconductor) dominated ring oscillator; 4) an NMOS (or N-channel MOS) dominated ring oscillator; 5) a memory circuit in which it is determined whether the memory cell or memory circuit can retain data, e.g., retain a 0 or retain a 1; 6) a domino circuit; 7) one or more transistors in which drain current (IDC) is measured and mapped to one of the 16 sections or directly mapped to a process region; and 8) an analog-to-digital converter (ADC) circuit in which the resulting drain current is mapped to one of the 16 sections which are mapped to a process region (or mapped directly to the process regions PR1, PR2 or PR3).

The first six process region detection circuits 1)-6) may be considered digital process region detection circuits, where each digital process region detection circuit outputs a signal at a frequency f. The frequency of the output signal may be mapped to one of the 16 sections (which may then be mapped to a process region PR1, PR2 and PR3, or which may be directly mapped to one of the process regions. A higher frequency corresponds to a faster process region. Process region detection circuits 7) and 8) may be considered analog detection circuits, for example. According to an example embodiment, it is advantageous to employ different types of process region (or process corner) detection circuits in parallel because this may allow testing of a greater variety of circuits and circuit types. Some types of process region detection circuits may be good at detecting some speeds (or some process regions), white other types of process region detection circuits are good at detecting other speeds or process regions.

Figure 2:
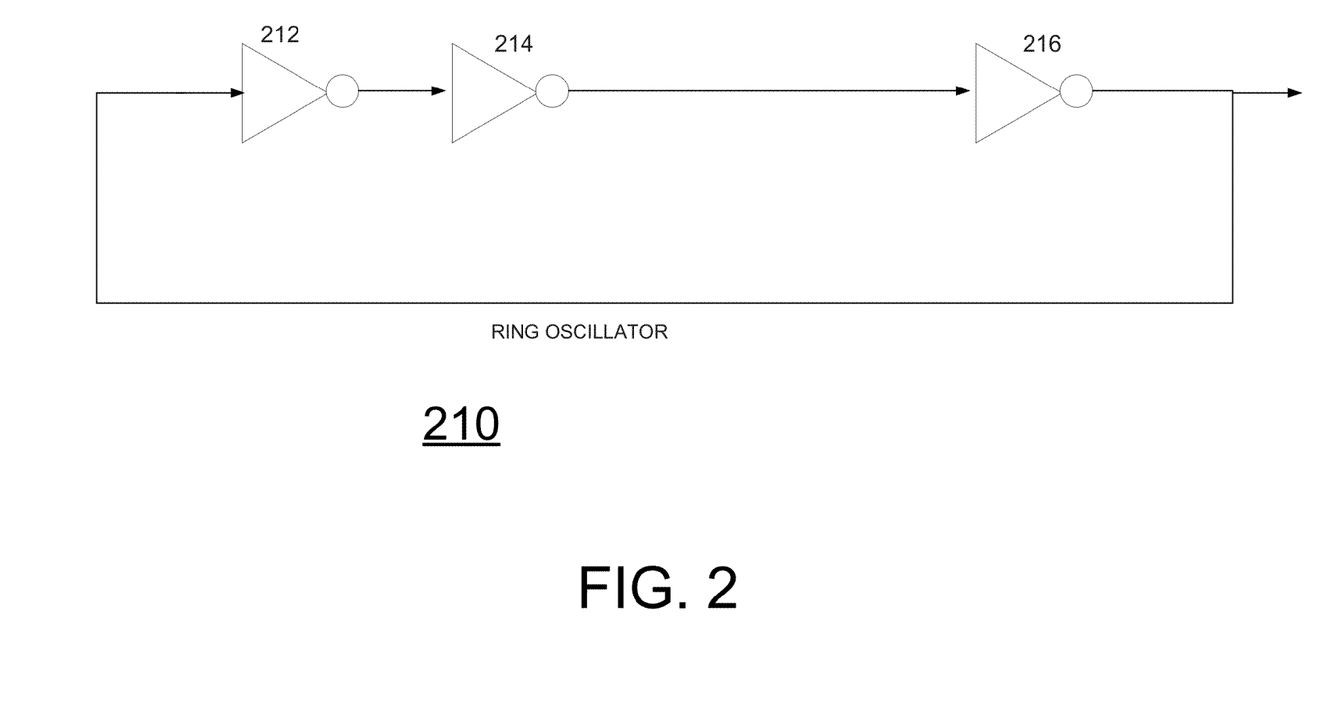
FIG. 2 is a diagram of a ring oscillator 210 according to an example implementation.

FIG. 2 is a diagram of a ring oscillator 210 according to an example implementation. Ring oscillator 210 may include a plurality of inverters 212, 214 and 216 connected in series, with the output from the last inverter connected back to the input of the first inverter. Although only 3 inverters are shown, any number (N) may be used. In an example implementation, the frequency f of the output signal may be represented as:

f=1/(N*td), where N is the number of inverters and td is the switching delay per inverter. A higher (or larger) switching delay td will cause a lower frequency f of the output signal (e.g., due to tower drain current, and a higher threshold voltage of the transistors of the inverters). Likewise, a shorter (or smaller) switching delay td of the inverters 212, 214, and 216 may correspond to a higher frequency f of the output signal (e.g., due to a higher drain current and/or tower threshold voltages of the transistors). In this manner, the frequency f of the signal output from the ring oscillator 210 may be mapped to one of the 16 sections, or to one of the three process regions shown in FIG. 1.

Different types of ring oscillators may be used, such as a standard ring oscillator in which P-channel and N-channel transistors are used, a differential ring oscillator. Also, a PMOS dominated ring oscillator may be used which may use or rely on primarily P-channel devices in the inverters so that the frequency of the output signal reflects or indicates the speed of the P-channel devices in the IC, independent of the N-channel devices. Likewise, an NMOS dominated ring oscillator may use or rely on mostly N-channel devices in the inverters so that the resulting frequency of the output signal reflects the speed of the N-channel devices in the IC, independent of the P-channel devices. In this manner, for example, the speed of N-channel and P-channel devices may be separately determined.

Each of the different types of process region detection circuits may provide a different test or process region detection scheme or technique. According to an example implementation, it is advantageous to use several or multiple types of process region detection circuits in order to provide a more comprehensive process region test for an IC. Thus, by using different types of process region detection circuits (which may be implemented using different types of circuit and using different detection schemes or techniques), a more reliable process region detection may be obtained that is less likely to cause a device failure or malfunction during operation. For example, it is desirable to include both one or more digital process region detection circuits and one or more analog process region detection circuits since the analog process region detection circuits are useful in identifying a process corner or edge of the grid 110 for an IC.

Figure 3:
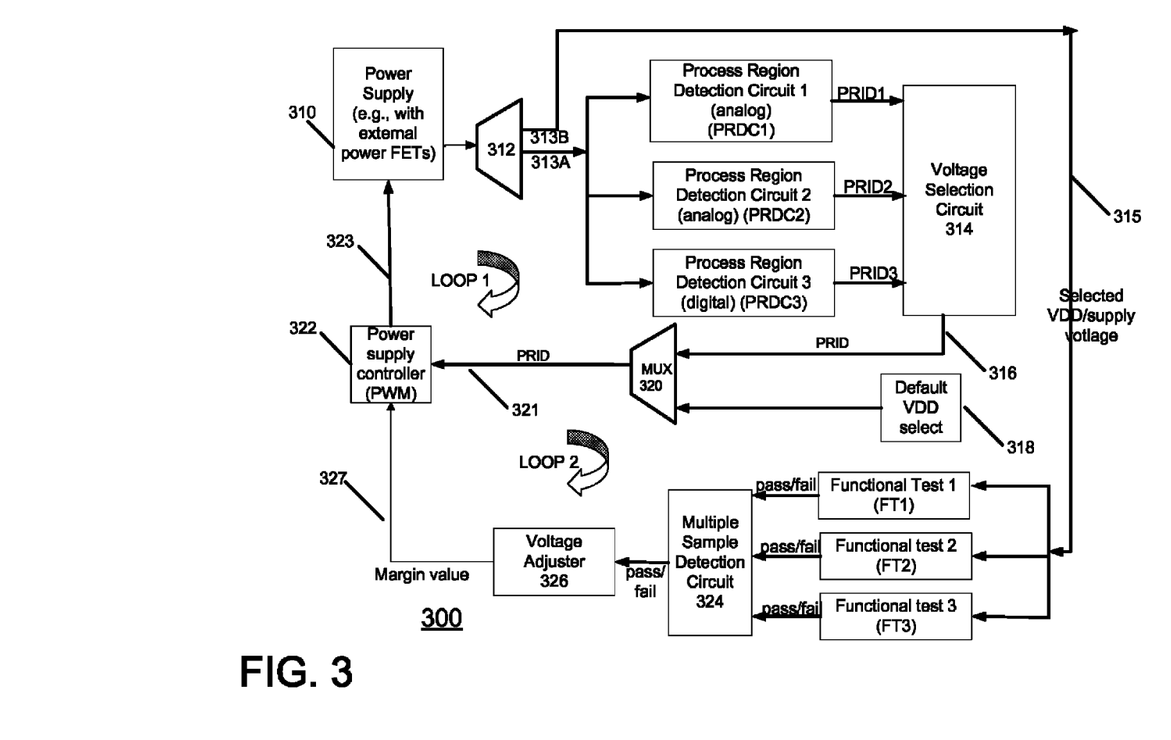
FIG. 3 is a diagram illustrating a circuit 300 for detecting a process region that uses multiple types of process region detection circuits according to an example implementation.

FIG. 3 is a diagram illustrating a circuit 300 for detecting a process region that uses multiple types of process region detection circuits according to an example implementation. According to an example implementation, circuit 300 uses a dual loop configuration that includes a first loop (or Loop 1) for identifying a process region and an associated supply voltage for an IC, wafer, tot, or process. To improve the detection of the process region, multiple process region detection circuits are used within Loop 1 to detect a process region and an associated supply voltage. A second loop (Loop 2) is then used to confirm or verify that the selected supply voltage allows correct operation of the IC by performing one or more functional tests using the selected supply voltage. In an example embodiment, if the functional test fails, then the selected supply voltage (identified in Loop 1) may be increased by a margin value, and then the functional test is repeated using the increased supply voltage. Again, if the functional test fails, the supply voltage may again be increased by a margin value, and the functional test is repeated using the further increased supply voltage. This process in Loop 2 may continue until the functional test passes. In an example implementation, the operation of circuit 300, including the detection of a process region using different (or multiple) types of process region detection circuits of Loop 1 and the functional test performed in Loop 2 may be performed at reset or power-on of a circuit. For example, over time, and also based on variations in temperature, a process region for an IC may change.

Referring to FIG. 3, initially, a power supply 310 (which may include, for example, one or more external power Field Effect Transistors or power FETs) may output a nominal (or standard or default) voltage to a mux 312. Mux 312 may output the supply voltage from power supply 310 to line 313A during the operation of Loop 1 to determine a process region. After the process region has been detected by multiple types of process region detection circuits (and an associated supply voltage has been selected), the mux 310 may output a selected supply voltage from power supply via line 313B to line 315 (since no further process region detection is necessary at this point).

Referring to FIG. 3, during the detection of the process region, the nominal supply voltage (or other voltage) may be initially output onto line 313A and input into multiple (and different types of) process region detection circuits, including process region detection circuit 1 (PRDC1), process region detection circuit 2 (PRDC2), and a process region detection circuit 3. While only 3 process region detection circuits are shown, any number may be used. The process region detection circuits PRDC1, PRDC2 and PRDC3 are of different types of process region detection circuits. For example, PRDC 1 and PRDC2 may be two different types of analog detection circuits and PRDC3 may be a digital process region detection circuit.

Each PRDC may identify or detect a process region for the IC, and may output an associated process region ID (MID) that identifies the detected process region as either PR1, PR2 or PR3. PRDC1 may identify or detect a process region and output a first PRID (PRID1). PRDC2 may identity or detect a process region and output a second PRID (PRID2). And, PRDC3 may identify or detect a process region and output a third PRID (PRID3). Alternatively, each PRDC may output a section ID that identifies one of the 16 (for example) sections of the process region detection grid 110, which may be mapped (by circuit 314) to a corresponding process region.

A voltage selection circuit 314 may identify a supply voltage associated with each PRID (or each identified/detected process region). The voltage selection circuit 314 may (e.g., via use of a comparator) may compare the voltages associated with each of the identified process regions, and may select the highest voltage. For example, 800 mV may be associated with PR1, 900 mV may be associated with PR2, and 1V (e.g., nominal voltage) may be associated with PR3.

As an example, if PRDC1 identifies PR3 (associated with a voltage of 1V, in this example), PRDC2 identifies PR2 (associated with 900 mV), and PRDC3 identifies PR1 (associated with 800 mV), then voltage selection circuit 314 would select 1V (the highest voltage of the identified process regions) as the supply voltage. Thus, in the event of a disagreement, or where the identified process regions are not the same from all process region detection circuits, the highest voltage of the identified process regions may be selected as the supply voltage. While, in the case of a disagreement, a lower voltage, e.g., 900 mV, may work for a portion of the IC, there may be a portion of the IC where such lower voltage may not allow proper or correct operation (such as, for example, as indicated by the PRDC that identified the PR1 associated with the higher voltage). By selecting the highest voltage of the identified process regions, this will allow the highest (or safest or most conservative) supply voltage to be used for the IC, e.g., to the extent there may be a disagreement among the different process region detection circuits.

Voltage selection circuit 314 may then output a selected PRID (or the PRID associated with the highest or selected voltage) onto line 316. Thus, the PRID on line 316 may provide an identification of the selected supply voltage (since the PRID is associated with a voltage). Mux 320 may then output via line 321 the PRID or other identifier that identifies the selected supply voltage.

The circuit 300 may also include a default VDD/supply voltage select block 318 to allow the Loop 1 to be turned off, which would cause mux 320 to output a PRID or identifies associated with the nominal supply voltage.

A power supply controller 322 may receive the PRID or other identifier that may identify the selected supply voltage. Power supply controller may output a pulse width modulated (PWM) signal via line 323 to the power supply 310. The PWM signal on line 323 may have a duty cycle that is used to select the supply voltage output by power supply 310. Thus, power supply controller 322 may vary the duty cycle of the PWM signal output to power supply 310 to adjust or change the supply voltage supplied to the IC. For example, a PWM signal having a 50% duty cycle may be used to cause the power supply 310 to output the nominal voltage (e.g., 1V). A PWM modulated signal having a 45% or 40% duty cycle may be used to cause a supply voltage of 900 mV and 800 mV, respectively, according to an example implementation. These are merely examples, and other duty cycles voltages may be used. Also, the use of a PWM signal with a variable duty cycle is just one way to control the supply voltage output by power supply 310, and other types of signals or control mechanisms may be used.

After a process region has been identifies by multiple process region detection circuits and a supply voltage has been selected, mux 312 may output the selected voltage via lines 313B and 315 to Loop 2, including the inputs of one or more functional test circuits, such as functional test circuit 1 (FT1), functional test circuit 2 (FT2), and functional test circuit 3 (FT3). In an example implementation, process region detection circuits may be circuits on the IC but not part of the standard data path or signal processing path during operation. Whereas, according to an example implementation, the functional test circuits FT1, FT2, and FT3 may be different types of functional test circuits that are part of the data path or signal processing path during operation of the IC. The functional test circuit may perform a digital function or a digital test using the selected power supply voltage. A pass or fail signal may be output from each functional test circuit. A pass signal indicates that the digital circuit (functional test circuit) operated correctly with the selected supply voltage, whereas a fail signal indicates that the functional test circuit did not operate correctly using the selected supply voltage.

A multiple sample detection circuit 324 (e.g., which may be implemented using an AND gate or other circuit) may receive the outputs (pass or fail) from the functional test circuits. If any of the functional tests failed (if any of the functional test circuits outputs a fail signal indicating failure of the functional test), then the multiple sample detection circuit 324 will output a fail signal to voltage adjuster 326. On the other hand, if all of the functional tests pass (all functional test circuits output a pass signal), then the multiple sample detection circuit 324 will output a pass signal to voltage adjuster 326.

There may be a number of reasons why a supply voltage selected in Loop 1 fails one or more of the functional tests in Loop 2. For example, the circuits used for one or more process region detection circuits may not be representative of all the devices on the IC. Or, an IR drop (or voltage drop caused by resistance on the IC) may cause one portion of the IC to receive a voltage that is less than the supply voltage. If this occurs, then Loop 2 may be used to iteratively increase the supply voltage by a margin value and then re-perform the functional test using the new supply voltage, until the functional test passes.

Voltage adjuster 326 may control or cause an increase in the supply voltage in the event that any of the functional tests fail. A failure of the functional test may indicate that a higher supply voltage should be selected in order to improve the likelihood that all circuits on the IC will operate correctly with the supply voltage. To perform this increase in supply voltage, voltage adjuster 326 may output a margin value onto line 327 if the signal output from circuit 324 is fail (meaning that at least one of the functional tests failed using the selected supply voltage). The margin value may, for example, identify a margin voltage to be added to the supply voltage. For example, if the selected supply voltage is 900 mV, a margin value may be used to identify a margin voltage of 10 mV. In an example embodiment, the margin voltage may be less than the voltage step (e.g., 100 mV) between successive voltages of the process regions (e.g., 800 mV, 900 mV and 1 V), to allow a finer adjustment in the supply voltage. If a pass signal is received by voltage adjuster 326, then a margin value of 0 (or zero) may be output on line 327, indicating that no margin voltage should be added to the supply voltage.

Power supply controller 322 may receive the margin value on line 327, and may adjust the duty cycle of the signal output on line 323 to cause power supply 310 to increase the supply voltage by the margin voltage. For example, if the margin value indicates a margin voltage of 10 mV, the power supply controller 322 may change the duty cycle of the PWM signal on line 323 from 45% (for 900 mV supply voltage) to 46% duty cycle (corresponding to the addition of a 10 mV margin voltage). Power supply 310, based on the adjusted 46% duty cycle of the signal output by power supply controller 322, may output an increased supply voltage of 910 mV (in this example) via line 313B and 315, which is input to the functional test circuits FT1, FT2, and FT3.

Functional test circuits will re-perform the functional test using this increased supply voltage (e.g., 910 mV), and a pass or fait signal is input to voltage adjuster 326. If the functional test passes, then the 910 mV will be used as the supply voltage for the IC, and the functional test is completed.

If, however, the functional test fails with using a 910 mV supply voltage, the supply voltage may be increased and function test may be repeated. In this example, the voltage adjuster circuit 326 may increase the margin value to indicate a larger margin voltage, e.g., a margin voltage of 20 mV. The power supply controller 322 may again adjust the duty cycle (e.g., from 46% to 47% duty cycle) to cause power supply 310 to increase the supply voltage (900 mV, as identified by the PPM received via mux 320) by the new margin voltage of 20 mV. Power supply outputs the new increased supply voltage of 920 mV which is received again by functional test, where the functional test is re-performed using the new 920 mV supply voltage. This process may repeat until a supply voltage is found where the functional test passes. This final supply voltage (where the functional test passes) is then used as the supply voltage for the IC.

Figure 4:
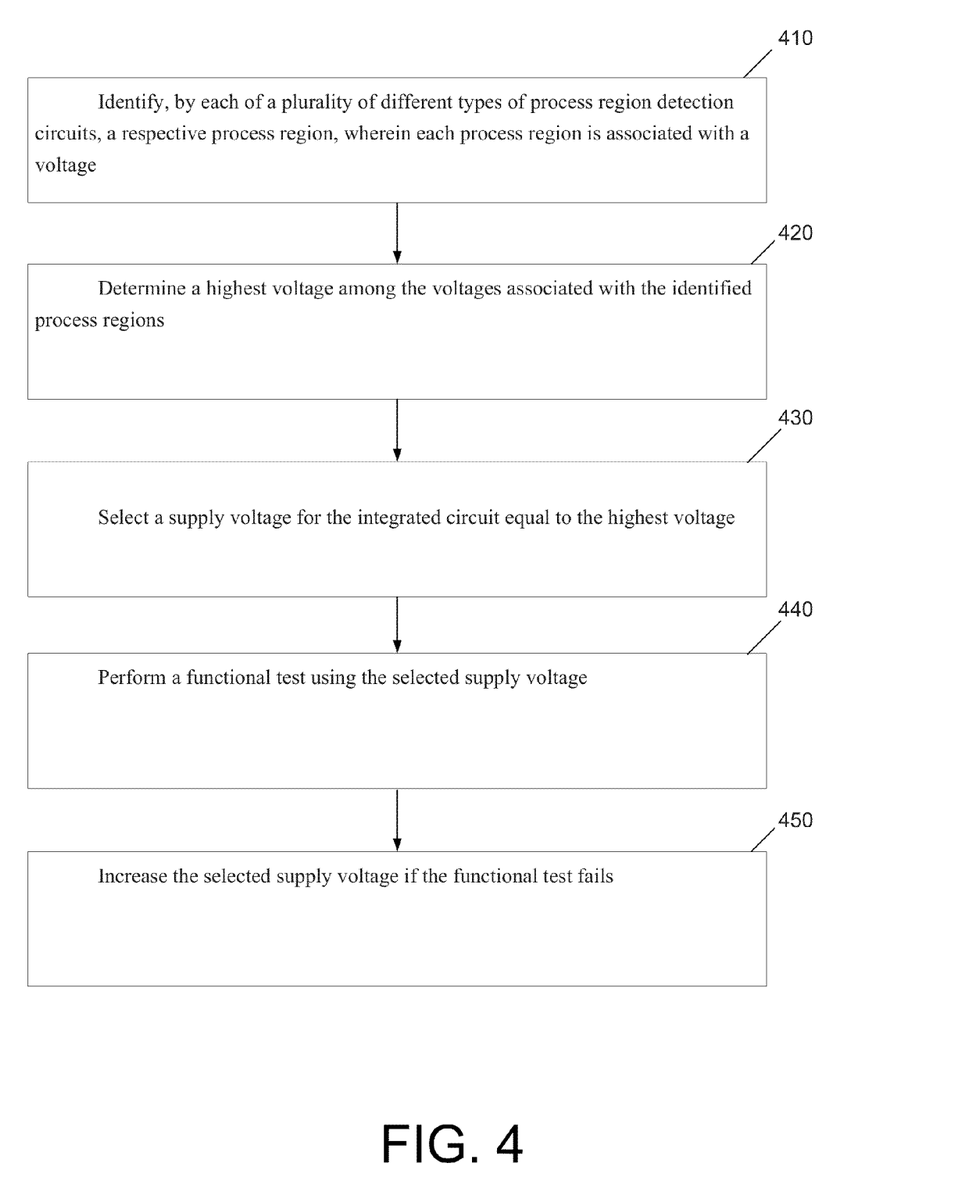
FIG. 4 is a flow chart illustrating operation a circuit for detecting a process region (or process corner) that uses multiple types of process region detection circuits according to an example implementation.

FIG. 4 is a flow chart illustrating operation a circuit for detecting a process region (or process corner) that uses multiple types of process region detection circuits according to an example implementation.

Each of a plurality of different types of process region detection circuits identifies a respective process region, wherein each process region is associated with a voltage (410). For example, process region detection circuits PRDC1, PRDC2, and/or PRDC3 (which may be different types of process region detection circuits) may identify or detect a process region. Different process regions may be associated with different voltages (e.g., different supply voltages). For example, a higher (0.9V or 1V) supply voltage may be associated with (or used for) slower process regions, and a lower supply voltage (e.g., 0.8V) may be associated with or used for faster process regions, while still allowing a circuit to operate properly.

A highest voltage may be determined (e.g., by voltage selection circuit 314) among the voltages associated with the identified process regions (420). Also, a supply voltage is selected (e.g., by voltage selection circuit 314) for the integrated circuit that is equal to the highest voltage (430). For example, a voltage associated with the slowest process region that is identified may be selected, which may typically correspond to the highest supply voltage of the identified process regions. Thus, for example, the process region detection circuit PRDC1 may identify a first process region associated with a 0.8 volt supply voltage, and the process region detection circuit PRDC 2 may identify a second process region associated with a 0.9 volt supply voltage. In this case, the highest voltage among the voltages associated with the identified process regions is 0.9 volts. Thus, a supply voltage is selected for the integrated circuit that is 0.9 volts, in this example.

A functional test is performed using the selected supply voltage (440). For example, one or more functional test circuits (FT1, FT2, FT3, . . . ) may perform one or more digital tests, and compare the test result to an expected (or correct) test result. In an example implementation, a functional test circuit may include digital circuits that are included within a data path (or data processing path) of the integrated circuit. If the test result (from the functional test circuit) matches the correct or expected output, then a pass signal is output from the functional test circuit. If the functional test fails, then a fait signal may be output from the functional test circuit, as an example.

The selected supply voltage is increased if the functional test fails (450). For example, a detection circuit 324 may detect the pass/fail signals output from one or more functional test circuits. If one of the functional tests fails, the multiple sample detection circuit 324 may output a fail signal to voltage adjuster 326. Voltage adjuster 326 may then output a signal via line 327 that may cause a supply voltage provided by power supply 310 to a circuit or integrated circuit to increase. In an example implantation, the functional tests may be repeated by FT1, FT2, and/or FT3, for example, using the new (or increased) supply voltage. The supply voltage may again be increased if the functional test fails, according to an example implementation.

Figure 5:
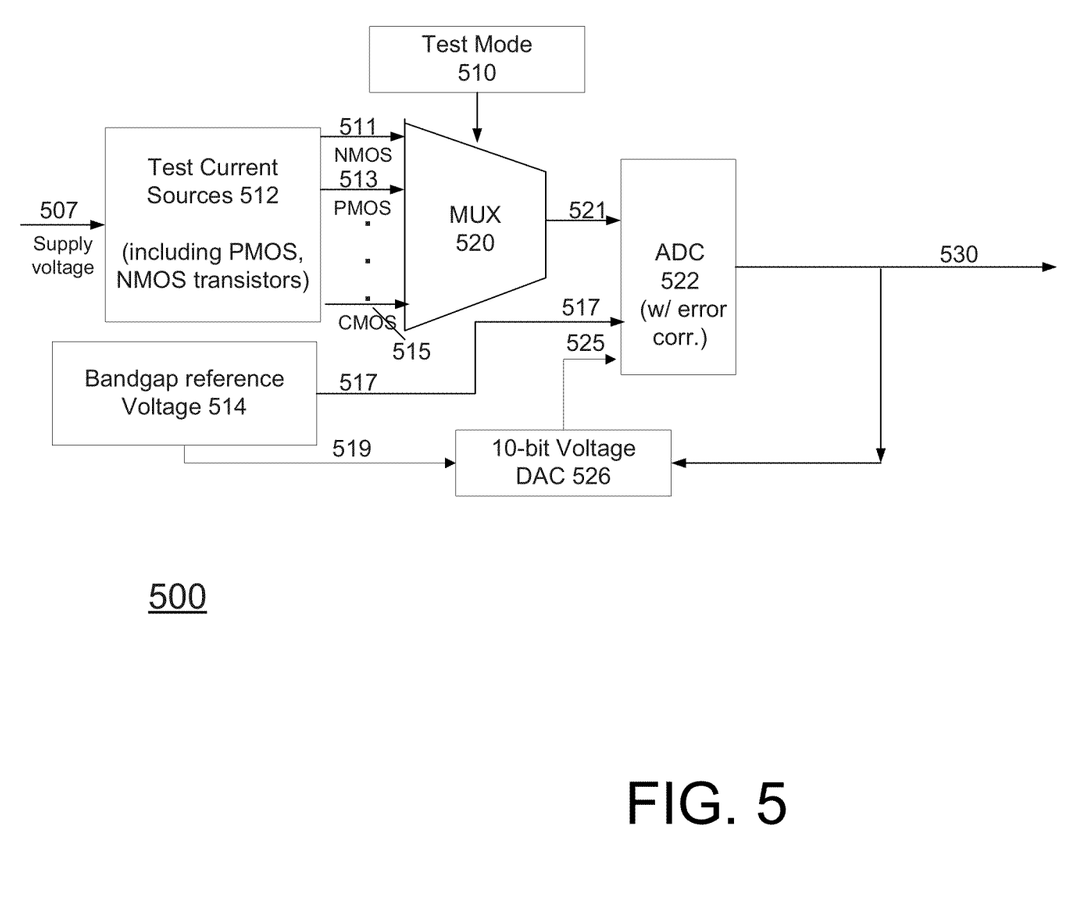
FIG. 5 is a diagram illustrating an analog to digital converter (ADC) process region detection circuit according to an example implementation.

FIG. 5 is a diagram illustrating an analog to digital converter (ADC) process region detection circuit according to an example implementation. A supply voltage is input or provided via line 507 to one or more test current sources 512. Current test sources 512 include N-channel Metal Oxide Semiconductor (NMOS) transistors and P-channel MOS transistors that are part of the integrated circuit, for example. Within test current sources 512, a first group of NMOS transistors may be a first current source and generate a drain current(s) that create a corresponding output voltage onto line 511. A group of PMOS transistors may be a second current source and may generate drain current(s) and output a corresponding voltage onto line 513. Similarly, other transistors may provide other test current sources, such as a CMOS (complimentary MOS) set of transistors that may include both PMOS and NMOS transistors, may output a voltage onto line 515. A higher drain current from each test current source may be associated with a faster process corner/process region. Therefore, the voltages output onto lines 511, 513 and 515 may be mapped to or associated with a process region (or process corner).

Test mode 510 provides a signal to mux 520 that selects a voltage output from one of the current sources 512, e.g., one of the voltages on lines 511, 513, 515, or from other current source. The selected voltage is output by mux 520 via line 521 to analog-to-digital converter (ADC) 522. ADC 522 converts the analog voltage signal received via line 521 to a digital value that is output onto line 530. The digital value (which may be N bits) output on line 530 may identify a process region (or may be mapped to a process region). The digital value on line 530 (corresponding to the voltage output by the selected test current source 512) is input to a digital-to-analog converter (DAC) 526. DAC 526 converts the output digital signal (on line 530) to a corresponding analog signal, which is output via line 525 to ADC 522. ADC 522 may then compare the analog voltage on line 521 to the analog voltage on line 525 (from DAC 526), and may subtract these values to obtain a quantization error signal. The quantization by ADC may be adjusted to decrease or minimize this quantization error. Test current sources 512 may allow different types of ADCs to be used to identify a process region, such as an NMOS ADC, a PMOS ADC, and a CMOS ADC, for example.

Also, bandgap reference voltage may be output from bandgap reference voltage generator 514 onto line 517 to ADC 522 and onto line 519 to DAC 526. The ADC 522 and DAC 526 may adjust the DAC or ADC conversion (or quantization steps) based on the bandgap reference voltage which may be a substantially constant voltage that does not vary based on temperature, for example.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
    identifying, by each of a plurality of different types of process region detection circuits, a respective process region, wherein each process region is associated with a voltage;
    determining a highest voltage among the voltages associated with the identified process regions;
    selecting a power supply voltage for the integrated circuit equal to the highest voltage;
    performing a functional test using the selected power supply voltage; and
    increasing the selected power supply voltage if the functional test fails.

2. The method of claim 1 wherein a process window includes a plurality of the process regions, and wherein the identified process regions may be a same process region or different process regions.

3. The method of claim 1 wherein the identifying comprises:
    identifying, by a first type of process region detection circuit, a first process region associated with a first voltage; and
    identifying, by a second type of process region detection circuit, a second process region associated with a second voltage.

4. The method of claim 3 wherein the determining comprises:
comparing the first voltage and the second voltage;
determining the highest voltage among the first voltage and the second voltage based on the comparing, wherein the first voltage or the second voltage is determined to be the highest voltage if the first voltage is the same as the second voltage.

5. The method of claim 1 wherein the increasing comprises increasing the power supply voltage by a margin value if the functional test fails, wherein the margin value is less than a difference between successive voltages of the different process regions.

6. The method of claim 1 wherein the performing a functional test comprises:
performing, by each of a plurality of different types of functional test circuits, a functional test using the selected power supply voltage; and
wherein the increasing comprises increasing the power supply voltage if the functional test performed by at least one of the functional test circuits fails.

7. The method of claim 1 wherein the method further comprises:
using the selected power supply voltage as the power supply voltage for the integrated circuit if the functional test passes; and
wherein the increasing comprises performing the following if the functional test fails:
increasing the selected power supply voltage; and
re-performing the functional test using the increased selected power supply voltage.

8. The method of claim 1 wherein the method further comprises:
using the selected power supply voltage as the power supply voltage for the integrated circuit if the functional test passes; and
wherein the increasing comprises:
performing the following if the functional test fails:
increasing the selected power supply voltage to a first increased power supply voltage;
re-performing the functional test using the first increased power supply voltage;
using the first increased power supply voltage as the power supply voltage for the integrated circuit if the re-performing of the functional test passes; and
increasing the first increased power supply voltage to a second increased power supply voltage if the re-performing of the functional test fails.

9. The method of claim 1 wherein the selecting comprises outputting a pulse-width modulated control signal having a duty cycle corresponding to the selected power supply voltage.

10. The method of claim 1 wherein the identifying comprises:
identifying, by a first analog process region detection circuit, a first process region;
identifying, by a second analog process region detection circuit, a second process region;
identifying, by a first digital process region detection circuit, a third process region; and
identifying, by a second digital process region detection circuit, a fourth process region.

11. The method of claim 1 wherein the process region identified by each of the plurality of different types of process region detection circuits is selected from the group including: a fast region, a typical or average region, and a slow region of a process window.

12. The method of claim 1 wherein the plurality of different types of process region detection circuits includes two or more of the following types of process region detection circuits:
a standard ring oscillator;
a differential ring oscillator;
a PMOS dominated ring oscillator;
an NMOS dominated ring oscillator;
a memory circuit;
a domino circuit, or an analog to digital converter circuit.

13. An apparatus comprising:
a plurality of different types of process region detection circuits, each process region detection circuit configured to identify a respective process region of a plurality of process regions;
a voltage selection circuit configured to determine a highest voltage among the voltages associated with the identified process regions and to select a power supply voltage for the integrated circuit that is equal to the highest voltage;
one or more functional test circuits configured to perform a functional test using the selected power supply voltage; and
a voltage adjuster circuit configured to increase the selected power supply voltage if the functional test fails.

14. The apparatus of claim 13 and further comprising a power supply controller coupled to an output of the voltage selection circuit and to an output of the voltage adjuster circuit, wherein the power supply controller is configured to output a control signal to a power supply to cause the power supply to output the selected power supply voltage, and wherein the power supply controller is further configured to adjust the control signal to increase the power supply voltage based on an output signal from the voltage adjuster circuit if the functional test fails.

15. The apparatus of claim 14 and further comprising the power supply configured to generate the selected power supply voltage in response to the control signal from the power supply controller.

16. The apparatus of claim 14 wherein the power supply controller comprises a pulse width modulator configured to vary a duty cycle of the control signal output to the power supply to select the power supply voltage.

17. The apparatus of claim 13 and further comprising a detection circuit configured to determine if each of the one or more functional test circuits passed their respective functional tests.

18. The apparatus of claim 13 wherein the plurality of different types of process region detection circuits includes two or more of the following types of process region detection circuits:
a standard ring oscillator;
a differential ring oscillator;
a PMOS dominated ring oscillator;
an NMOS dominated ring oscillator;
a memory circuit;
a domino circuit, or
an analog to digital converter circuit.

19. The apparatus of claim 13 wherein each of the one or more functional test circuits is configured to perform a respective functional test using the selected power supply voltage; and
wherein the voltage adjuster circuit is configured to increase the selected power supply voltage if the functional test performed by at least one of the functional test circuits fails.

20. An apparatus comprising:
- a plurality of different types of process region detection circuits, each process region detection circuit configured to identify a respective process region of a plurality of process regions;
- a voltage selection circuit configured to determine a highest voltage among the voltages associated with the identified process regions and to select a power supply voltage for the integrated circuit that is equal to the highest voltage;
- one or more functional test circuits configured to perform a functional test using the selected power supply voltage;
- a voltage adjuster circuit configured to increase the selected power supply voltage if the functional test fails; and
- a power supply controller coupled to an output of the voltage selection circuit and to an output of the voltage adjuster circuit, wherein the power supply controller is configured to output a control signal to a power supply to cause the power supply to output the selected power supply voltage.

* * * * *